(12) United States Patent
Sano et al.

(10) Patent No.: US 7,846,367 B2
(45) Date of Patent: Dec. 7, 2010

(54) SHEET OR FILM-FORMING ROLL, SHEET OR FILM-FORMING APPARATUS AND CROWNING CONTROL METHOD

(75) Inventors: Takayoshi Sano, Fuji (JP); Akihiro Iwata, Gotenba (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 1017 days.

(21) Appl. No.: 11/614,223

(22) Filed: Dec. 21, 2006

(65) Prior Publication Data

US 2007/0155606 A1    Jul. 5, 2007

(30) Foreign Application Priority Data

Dec. 27, 2005    (JP) .............................. 2005-376029

(51) Int. Cl.
B28B 1/14    (2006.01)
(52) U.S. Cl. ............................ 264/299; 425/363; 492/5
(58) Field of Classification Search ................. 264/299; 425/363; 492/5, 1, 2, 3, 4, 6
See application file for complete search history.

(56) References Cited

U.S. PATENT DOCUMENTS

| | | | | |
|---|---|---|---|---|
| 3,470,948 | A | * | 10/1969 | Korsch .......................... 165/86 |
| 3,490,119 | A | * | 1/1970 | Fukuyama et al. ............. 492/52 |
| 3,747,181 | A | * | 7/1973 | Nykopp et al. ................. 492/5 |
| 4,068,360 | A | * | 1/1978 | Freuler ........................... 492/7 |
| 4,071,081 | A | | 1/1978 | Chielens et al. |
| 4,233,011 | A | | 11/1980 | Bolender et al. |
| 4,440,214 | A | * | 4/1984 | Wedel .......................... 165/90 |
| 4,823,450 | A | | 4/1989 | Ramisch et al. |
| 5,060,357 | A | | 10/1991 | Roerig et al. |
| 5,188,273 | A | | 2/1993 | Schmoock |
| 5,567,448 | A | | 10/1996 | Frankland |
| 5,943,895 | A | | 8/1999 | Lemper |
| 5,984,568 | A | | 11/1999 | Lohbeck |
| 5,984,658 | A | | 11/1999 | Shimizu |
| 6,129,017 | A | * | 10/2000 | Mohrmann et al. ......... 101/376 |
| 2004/0113316 | A1 | | 6/2004 | Fujii et al. |
| 2006/0211556 | A1 | | 9/2006 | Sano |
| 2007/0052118 | A1 | | 3/2007 | Kudo et al. |
| 2007/0063376 | A1 | | 3/2007 | Sano et al. |

FOREIGN PATENT DOCUMENTS

CN    1834567    9/2006

(Continued)

OTHER PUBLICATIONS

Notice of Allowance in the counterpart Taiwan application No. 0951490256, issued on Jun. 25, 2009.

(Continued)

*Primary Examiner*—Joseph S Del Sole
*Assistant Examiner*—David N Brown, II
(74) *Attorney, Agent, or Firm*—DLA Piper LLP US

(57) ABSTRACT

A sheet or film-forming roll has an inner cylindrical member and an elastic outer cylindrical member. The inner cylindrical member has a pressure chamber therein. As the inner cylindrical member becomes deformed (crowing change) depending on a pressure value of incompressible fluid led to the pressure chamber, the elastic outer cylindrical member becomes deformed (crowing change) too.

8 Claims, 4 Drawing Sheets

FOREIGN PATENT DOCUMENTS

| | | |
|---|---|---|
| DE | 1261188 | 9/1967 |
| DE | 1575524 | 1/1970 |
| DE | 69731321 | 10/2005 |
| DE | 102006012398 | 9/2006 |
| DE | 102006044463 | 5/2007 |
| JP | H 03-227858 | 10/1991 |
| JP | 4-164741 | 6/1992 |
| JP | H 10-217314 | 8/1998 |
| JP | 10-315304 | 12/1998 |
| JP | 11-207817 | 8/1999 |
| JP | H11-235747 | 8/1999 |
| JP | H 11-314263 | 11/1999 |
| JP | 2000-506795 | 6/2000 |
| JP | 2000-239409 | 9/2000 |
| JP | 3194904 | 8/2001 |
| JP | 2002-036332 | 2/2002 |
| JP | 3422798 | 6/2003 |
| JP | 2005-138509 | 2/2005 |
| JP | 2006-256159 | 9/2006 |
| JP | 2007-083577 | 4/2007 |
| KR | 10-0671216 | 1/2007 |
| KR | 2007-26264 | 3/2007 |
| TW | 019205 | 9/1975 |
| TW | 189464 | 8/1992 |
| TW | 194705 | 11/1992 |
| TW | 324686 | 1/1998 |
| TW | 496797 | 8/2002 |
| WO | WO 97/34754 | 9/1997 |

OTHER PUBLICATIONS

Search Report in the counterpart Taiwan application No. 095149026, issued on Jun. 25, 2009.
English translation of search report in the counterpart Taiwan application No. 095149026, issued on Jun. 25, 2009.
English Language Abstract of JP 2005-138509.
English Language Machine Translation of JP 2005-138509.
Office Action issued in counterpart Korean Application No. 10-2006-133621, mailed Sep. 18, 2007, accompanied by an English translation.
Office Action issued in counterpart foreign German Application No. 10 2006 061 040.7-16, mailed Mar. 10, 2008.
English language translation of the Office Action issued in counterpart foreign German Application No. 10 2006 061 040.7-16, mailed Mar. 10, 2008.
Office Action dated Nov. 17, 2009 issued in U.S. Appl. No. 12/126,202.
Korean Office Action mailed Oct. 21, 2009 in Application No. 10-2008-47783.
English Language Abstract of KR 2007-26264 published Mar. 8, 2007.
Partial English Language translation for Korean Office Action mailed Oct. 21, 2009 in Application No. 10-2008-47783.
German Office Action issued in Application No. 102006044463.9-16 mailed Jan. 24, 2008.
English translation of German Office Action issued in Application No. 102006044463.9-16 mailed Jan. 24, 2008.
English translation of DE 1 251 188, published Sep. 28, 1967.
Taiwan IPO Search Report issued in Application No. 095134908 mailed Jul. 30, 2008.
English language abstract of Taiwan IPO Search Report issued in Application No. 095134908 mailed Jul. 30, 2008.
English language translation of TW189464.
English language abstract of TW019205.
Machine English language translation of JP 2005-138509.
Machine English language translation of JP 11-207817.
English language abstract of JP 04-164741.
English language abstract of JP 11-207817.
English language abstract of JP 2005-138509.
Office Action issued in Japanese Application No. 2005-275602, dated Feb. 10, 2009.
English language translation of Office Action issued in Japanese Application No. 2005-275602, dated Feb. 10, 2009.
English language abstract of International Application No. WO 97/28950, which was also published as JP 3422798.
English language abstract of JP 11-235747.
English abstract of JP-10-315304.
English translation of Korean Abstract published under Korean Publication No. 10-0671216.
English Language Abstract of JP 3422798.
English Language Translation of TW 496797.
English Language Abstract of JP 2000-506795.
English Language Abstract of DE 69731321.
English Language Machine Translation of JP 11-235747.
English Language Machine Translation of JP 10-315304.
Office Action issued in counterpart Chinese Application No. 200610156230.2 dated Oct. 31, 2008.
English language translation of Office Action issued in counterpart Chinese Application No. 200610156230.2 dated Oct. 31, 2008.
English Language Machine Translation of JP 2002-036332.
English Language Abstract of JP 2002-036332.
English Language Machine Translation of JP 3422798.
English Language Machine Translation of JP 2000-506795.
English abstract of JP-2006-256159 published Sep. 26, 2006.
Machine English language translation of JP-2006-256159 published Sep. 26, 2006.
Notice of Allowance issued in counterpart Taiwan Application No. 096147234 on Jan. 27, 2010.
Search Report issued in counterpart Taiwan Application No. 096147234 on Jan. 26, 2010.
English abstract of CN1834567A issued on Sep. 20, 2006.
Machine English language translation of JP 3194904B2 issued on Aug. 6, 2001.
English abstract of TW324686 issued on Jan. 11, 1998.
Office Action issued in JP 2005-376468 on Apr. 13, 2010.
English Language Translation of Office Action issued in JP 2005-376468 on Apr. 13, 2010.
Office Action issued in JP 2005-376029 on Apr. 13, 2010.
English Language Translation of Office Action issued in JP 2005-376029 on Apr. 13, 2010.
English Language Abstract of JP 2000-239409 published Sep. 5, 2000.
English machine language translation of JP 2000-239409 published Sep. 5, 2000.
English Language Abstract of JP H 10-217314 published Aug. 18, 1998.
English machine language translation of JP H 10-217314 published Aug. 18, 1998.
English Language Abstract of JP 2007-083577 published Apr. 5, 2007.
English machine language translation of JP 2007-083577 published Apr. 5, 2007.
English Language Abstract of JP H 11-314263 published Nov. 16, 1999.
English machine language translation of JP H 11-314263 published Nov. 16, 1999.
USPTO Image File Wrapper of Related U.S. Appl. No. 11/534,339 electronically captured on Jun. 29, 2010.
USPTO Image File Wrapper of Related U.S. Appl. No. 12/473,579 electronically captured on Jun. 29, 2010.
USPTO image File Wrapper of Related U.S. Appl. No. 12/518,511 electronically captured on Jun. 29, 2010.
English Language Abstract of JP 3-227858 published Oct. 8, 1991.
International Search Report issued in PCT/JP2007/073797 published Feb. 5, 2008.

* cited by examiner

SHEET OR FILM-FORMING ROLL, SHEET OR FILM-FORMING APPARATUS AND CROWNING CONTROL METHOD

BACKGROUND OF THE INVENTION

1. Field of the Invention

The present invention relates to sheet or film-forming rolls, sheet or film-forming apparatus and crowning control methods, and more particularly, relates to a touch roll and a crowning control method suitable for forming thin sheets or films.

2. Description of the Related Art

There has been known a touch roll type method for continuously forming a sheet or film by supplying melting resin between a pair of opposed rolls, a main roll and a sub roll (touch roll), from a T-die. In general, inside the touch roll heating medium is circulated to regulate a surface temperature thereof.

In this kind of sheet or film-formation, there is a touch roll whose outer surface is flat in its axial direction. In forming a relatively thick sheet or film, even though pressure applied on the touch roll is increased, the touch roll keeps contacting the melting resin in its full width. As a result, a flat sheet or film is formed.

In forming a thin sheet or film, however, as the pressure is increased, the touch roll bends in an arch-like shape making a gap against the main roll at a center of the touch roll, thereby reducing the pressure at a center of the touch roll and bringing a lack of contact. As a result, a non-flat sheet or film is formed.

Japanese Patent Publication Laid-open No. 2002-36332 discloses a touch roll having a double structure of an outer cylinder and an inner cylinder. The outer cylinder has a metallic thin-walled structure with a predetermined amount of crowning shaped thereon not to make the gap.

In actual sheet or film-forming, however, thickness of a film to be formed or kind of resin to be used is various. Accordingly an appropriate pressure to be applied on the touch roll changes as well as an appropriate amount of crowning changes. The touch roll thus lacks flexibility.

Japanese Patent Publication No. 3422798 (referred to as "D2" below) discloses a touch roll (the first roll) having a metallic thin-walled cylinder (see FIG. 1). An amount of crowning to be given on the first roll is adjusted by controlling pressure on heating medium (cooling water) supplied inside the metallic thin-walled cylinder. The first roll has a problem that the amount of crowning becomes instable. Given on the heating medium circularly, the pressure is easy to fluctuate. In fact, the heating medium is used for two purposes: (1) controlling its temperature for cooling; and (2) giving pressure thereon for crowing. Another problem is a limit on pressure capacity of sealing members, which is 450-600 kPa at most in which increasing the pressure causes seal leakage.

"D2" discloses another touch roll (the second roll) with an eccentric double structure of an outer metallic thin-walled cylinder and an inner cylinder (see FIG. 17). The inner cylinder has an elastic surface contacting an inner surface of the outer metallic thin-walled cylinder by fixing the inner cylinder eccentrically to the outer metallic thin-walled cylinder. Since an amount of crowning to be given on the second roll is adjusted by controlling pressure on heating medium (cooling water) supplied inside the outer metallic thin-walled cylinder, the second roll has the same problems as the first roll, the instability of crowning and the limitation of pressure capacity of sealing.

"D2" discloses another touch roll (the third roll) having a concentric double structure (see FIGS. 6-8). Both cylinders are filled with medium: an outer cylinder with crowning medium and an inner cylinder with cooling medium. The third roll has another problem in controlling an outer surface temperature because the cooling medium is away from the outer surface.

Japanese Patent Publication Laid-open No. 2000-506795 discloses another touch roll with a concentric double structure of an outer cylinder filled with cooling medium and an inner cylinder filled with crowning medium. The touch roll has a limit on an amount of crowning because the crowning medium is away from an inner surface of the outer cylinder.

SUMMARY OF THE INVENTION

The present invention is made in view of the above problems. An object of the present invention is to provide a sheet or film-forming roll, sheet or film-forming apparatus and crowning control method that enable to adjust and stabilize an amount of crowning given thereon and to make it easy to control the surface temperature thereof.

To achieve the above object, the first aspect of the present invention provides a sheet or film-forming roll, comprising: an inner cylindrical member including an elastic cylindrical body having a pressure chamber of a hermetically closed structure therein and a shaft portion having a first passage that leads incompressible fluid to the pressure chamber; an elastic outer cylindrical member arranged eccentrically to the inner cylindrical member so that an inner circumferential surface of the outer elastic cylindrical member comes into contact with an outer circumferential surface of the elastic cylindrical body, the outer cylinder member being provided with a thin-walled structure and made from metal.

The second aspect of the present invention provides a crowning control method of a sheet or film-forming roll, comprising a sheet or film-forming roll including: an inner cylindrical member including an elastic cylindrical body having: a pressure chamber of a hermetically closed structure therein; and a shaft portion having a first passage that leads incompressible fluid to the pressure chamber; an elastic outer cylindrical member arranged eccentrically to the inner cylindrical member so that an inner circumferential surface of the outer elastic cylindrical member comes into contact with an outer circumferential surface of the elastic cylindrical body, the outer cylinder member being provided with a thin-walled structure and made from metal, the crowning control method comprising: giving a pressure to the incompressible fluid led to the pressure chamber via the first passage; measuring the pressure given to the incompressible fluid; calculating a target value of pressure to be given to the incompressible fluid to give an amount of crowning to be given to the outer cylindrical member; and reducing the pressure given to the incompressible fluid close to the target value.

The third aspect of the present invention provides a sheet or film-forming apparatus, comprising: a sheet or film-forming roll including: an inner cylindrical member including an elastic cylindrical body having: a pressure chamber of a hermetically closed structure therein; and a shaft portion having a first passage that leads incompressible fluid to the pressure chamber; an elastic outer cylindrical member arranged eccentrically to the inner cylindrical member so that an inner circumferential surface of the outer elastic cylindrical member comes into contact with an outer circumferential surface of the elastic cylindrical body, the outer cylinder member being provided with a thin-walled structure and made from metal; a hydraulic source that gives a pressure to the incompressible fluid led to the pressure chamber via the first passage; a pressure sensor that measures the pressure given to the incompressible fluid; a crowning controller that calculates a target value of pressure to be given to the incompressible fluid to give an amount of crowning to be given to the outer cylindrical member; and a pressure controller that reduces the pressure given to the incompressible fluid close to the target value.

DETAILED DESCRIPTION OF THE PREFERRED EMBODIMENTS

Figure 1:
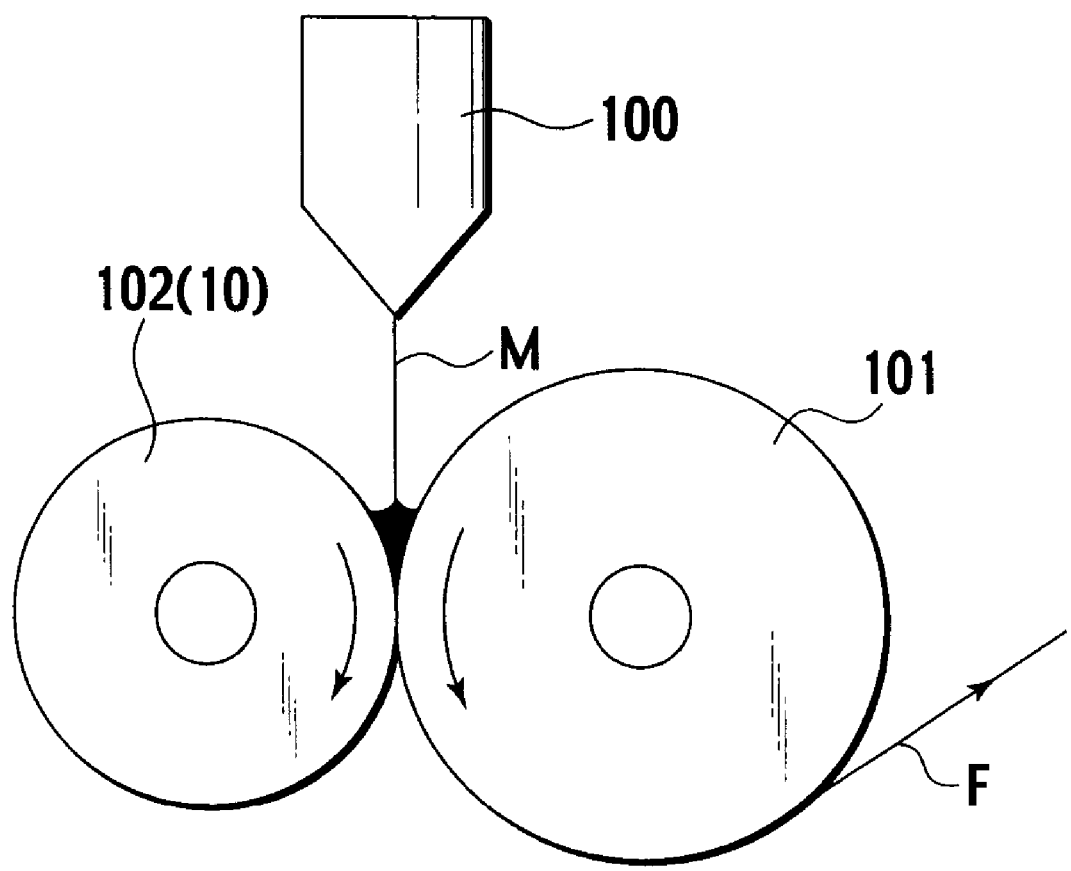
FIG. 1 is an explanatory view of a sheet or film-forming method using a sheet or film-forming roll according to the present invention.

First, there is explained a sheet or film-forming method with reference to FIG. 1. Melting resin M is supplied between a pair of opposed rolls, a main roll 101 and a sub roll (touch roll) 102, from a T-die 100 to continuously form a sheet or film F. To the sub roll (touch roll) 102 a sheet or film-forming roll according to the present invention is applied.

Next, there is explained an embodiment of a sheet or film-forming apparatus applying a sheet or film-forming roll according to the present invention with reference to FIGS. 2-5. When there is a same structure at both ends of a shaft of the sheet or film-forming roll 10, only one end will be explained with the other end put in parenthesis.

A sheet or film-forming apparatus 200 comprises the sheet or film-forming roll 10, an external tube 37, a hydraulic source 38, a pressure control valve (pressure controller) 39, a crowning control device (crowning controller) 40 and a pressure sensor 41.

The sheet or film-forming roll 10 comprises an inner cylindrical member 20 and a metallic elastic outer cylinder (elastic outer cylindrical member) 50. The elastic outer cylinder 50 is made of metal.

The inner cylindrical member 20 comprises: a shaft member 21 at an operating end (right side in FIGS. 1 and 2) and a shaft member 22 at a driving end (left side in FIGS. 1 and 2), each shaft member 21 (22) having a flange part 23 (24) integrally formed on one end thereof; and an elastic cylindrical body 25 fixedly mounted between both flange parts 23, 24. The shaft members 21, 22 and the elastic cylindrical body 25 are arranged concentrically.

The elastic cylindrical body 25 of the inner cylindrical member 20 comprises: a metallic cylindrical member 26 with its both ends welded to the flange parts 23, 24; and a rubber roll 27 attached around the metallic cylindrical member 26. The rubber roll 27 is glued to the entire circumferential surface of the metallic cylindrical member 26, which is comprised of a rubber-like elastic material such as silicon-rubber or ethylene-propylene rubber.

Inside the metallic cylindrical member 26, a pressure chamber 28 is provided for crowning with both ends closed by the flange parts 23, 24. That is, the pressure chamber 28 is a hermetically closed structure composed of the metallic cylindrical member 26 of the elastic cylindrical body 25 and the flange parts 23, 24 of the shaft members 21, 22.

Since the flange parts 23, 24 bind respective both ends of the metallic cylindrical member 26 and the rubber roll 27, the metallic cylindrical member 26 and the rubber roll 27 are deformed elastically together in a drum shape depending on the pressure value of oil (incompressible fluid) to be supplied to the pressure chamber 28. The inner cylindrical member 20 is thus given an amount of crowning corresponding to inner pressure of the pressure chamber 28. Accordingly the amount of crowning is adjustable.

The shaft member 22 has an incompressible fluid leading passage 29 with one end opening to the pressure chamber 28 and the other end opening to a central opening at a shaft end of the shaft member 22. The shaft end of the shaft member 22 is connected to the external tube 37 through a rotary joint 36. Through the external tube 37 and the incompressible fluid leading passage 29, the oil is supplied to the pressure chamber 28.

Upstream of the external tube 37, there are provided the hydraulic source 38, the pressure control valve 39, the crowning control device 40 and the pressure sensor 41, for regulating pressure given to the oil. The hydraulic source 38 gives the oil a predetermined pressure.

The crowning control device 40 is electronically controlled by a computer for instance and outputs pulse signals to control the pressure control valve 39. The pressure control valve 39 is electrically operated by a stepping motor for instance and quantitatively adjusts pressure of the oil generated from the hydraulic source 38. The pressure sensor 41 measures a pressure value of the oil in the external tube 37 downstream of the pressure control valve 39.

In particular, the crowning control device 40 controls the pressure control valve 39 as the following steps: inputting information of a setting value of roll pressing force, thickness of a sheet or film to be formed, or kind of resin to be used; calculating a pressure value on the basis of the above information to get an optimal amount of crowning as a control target value; and outputting pulse signals to the pressure control valve 39 to make a control deviation zero. Here the control deviation being a deviation of the pressure value detected by the pressure sensor 41 from the control target value.

This enables to adjust the pressure value on the external tube 37 to the control target value under a feedback control using the pressure control valve 39. Accordingly, pressure in the pressure chamber 28 becomes equal to pressure corresponding to the control target value.

Next, there is explained a rotary drive of the inner cylindrical member 20. The shaft member (shaft portion) 21 (22) of the inner cylindrical member 20 is rotatably supported by a bearing part 90 at the operating end (a bearing part 91 at the driving end) through a bearing member 92 (93). The inner cylindrical member 20 is thus enabled to rotate around its axis.

The shaft member 22 at the driving end is connected to an electrical driving device (electrical motor) 30 through a power transmission mechanism 31 of a belt type. The electrical driving device 30 drives the inner cylindrical member 20 to rotate. Note that it is possible to equip the electrical driving device 30 with a speed reduction device, or provide a speed reduction mechanism between the shaft member 22 and the electrical driving device 30.

Figure 3:
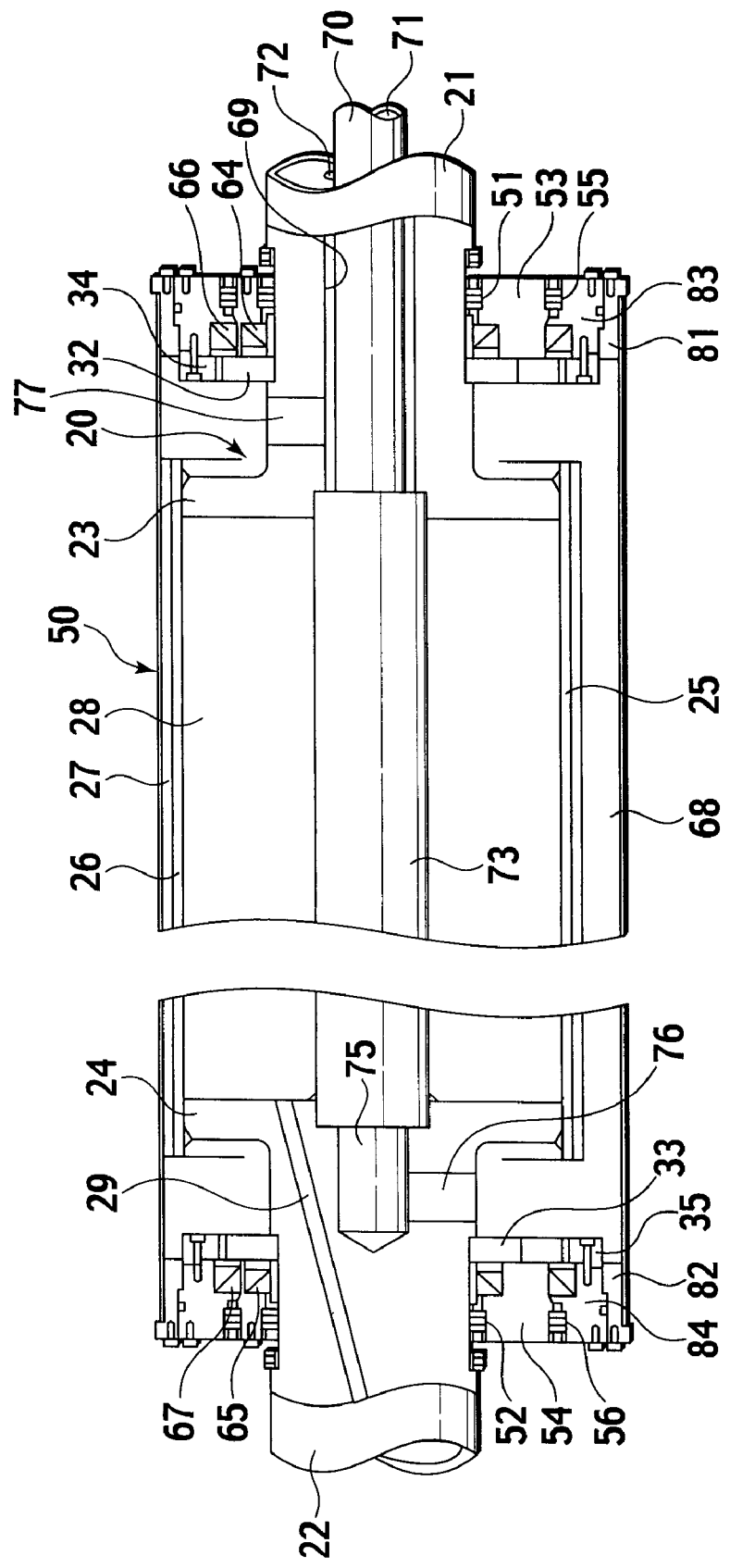
FIG. 3 is an enlarged sectional view of a substantial part of the sheet or film-forming roll of FIG. 2.
Figure 5:
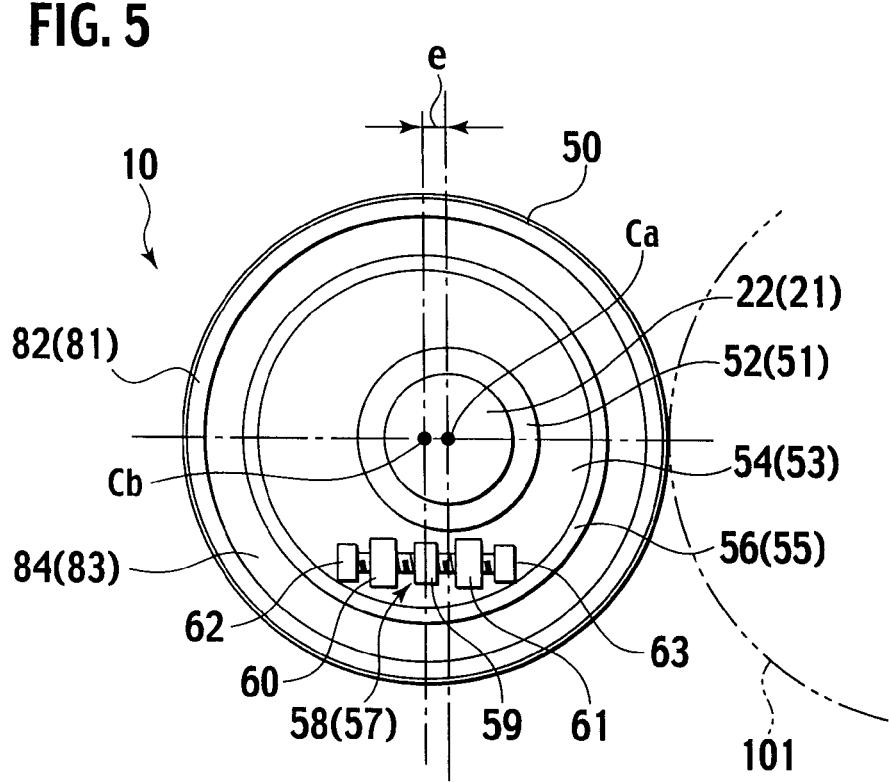
FIG. 5 is an enlarged sectional view taken along a line V-V of FIG. 2.

As shown in FIG. 3, the shaft member 22 (21) of the inner cylindrical member 20 rotatably support a disk-shaped eccentric side plate 54 (53) through an inner roller bearing 52 (51). As shown in FIG. 5, a center "Cb" of the eccentric side plate 54 (53) is deviated (eccentric) from a center "Ca" of the inner cylindrical member 20 with an amount of eccentricity "e".

Next, there is explained a rotary drive of the metallic elastic outer cylinder 50. As shown in FIG. 3, the metallic elastic outer cylinder 50 has ring-shaped end members 81, 82, each end member 81 (82) being integrally formed inside each end of the cylinder 50. The end member 81 (82) has a ring-shaped gear mounting member 83 (84) integrally formed inside thereof. The metallic elastic outer cylinder 50 is a cylindrical body of a metallic thin plate such as stainless steel.

The gear mounting member 83 (84) is rotatably supported by the eccentric side plate 53 (54) at its outer circumferential surface through an outer roller bearing 55 (56). Accordingly the metallic elastic outer cylinder 50 with both gear mounting members 83, 84 and both end members 81, 82 is rotatably supported by the eccentric side plates 53, 54 through the outer roller bearings 55, 56, respectively.

Figure 4:
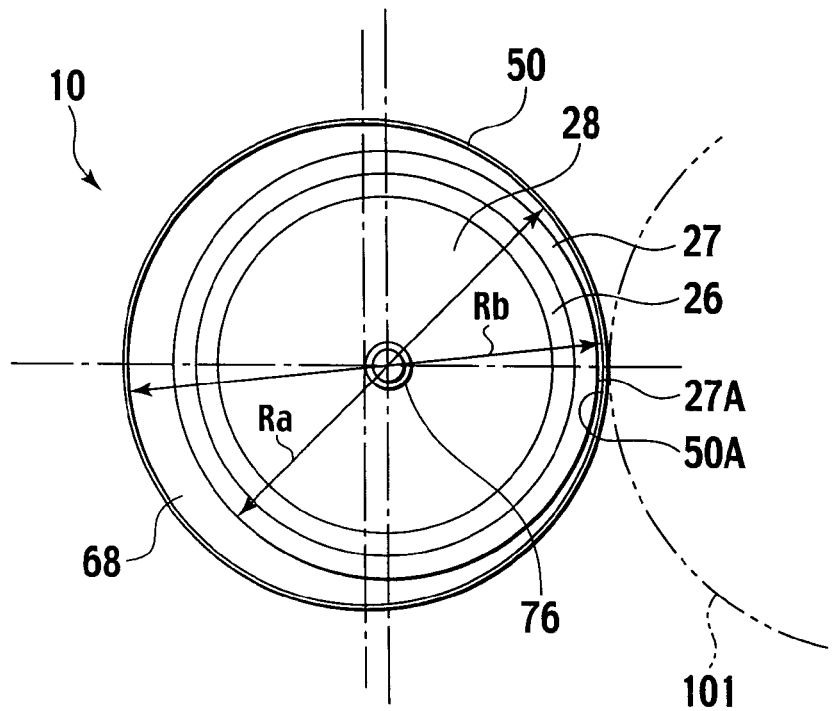
FIG. 4 is an enlarged sectional view taken along a line IV-IV of FIG. 2.

As shown in FIG. 4, the metallic elastic outer cylinder 50 has an inner diameter "Rb" which is sufficiently longer than an outer diameter "Ra" of the rubber roll 27 of the inner cylindrical member 20 and accommodates the rubber roll 27 within a cylinder inside 68. An inner circumferential surface 50A of the metallic elastic outer cylinder 50 is enabled to contact an outer circumferential surface 27A of the rubber roll 27 by disposing the metallic elastic outer cylinder 50 eccentrically with respect to the inner cylindrical member 20. A side of the contact will be referred to as an eccentric closing side below (right side in FIG. 4).

Note that it is possible to provide a gap between the inner circumferential surface 50A and the outer circumferential surface 27A under no load, and to make both surfaces contact when the metallic elastic outer cylinder 50 is elastically deformed by contacting the opposed main roll 101. This makes it easy to combine the inner cylindrical member 20 having the rubber roll 27 and the metallic elastic outer cylinder 50.

Next, there is explained a gear mechanism used to transfer rotation torque of the inner cylindrical member 20 to the metallic elastic outer cylinder 50. As shown in FIG. 3, an inner gear (pinion) 32 (33) is fixedly mounted on the shaft member 21 (22). A ring-shaped outer gear 34 (35) concentric with the metallic elastic outer cylinder 50 is fixedly mounted on the gear mounting member 83 (84). The inner gear 32 (33) and the outer gear 34 (35) are engaged at the eccentric closing side (right side in FIG. 4). The engagement transfers the rotation torque of the shaft members 21, 22, which is of the inner cylindrical member 20, to the metallic elastic outer cylinder 50.

Note that it is also possible to provide the inner gear 32 (33) and the outer gear 34 (35) outside the metallic elastic outer cylinder 50.

The metallic elastic outer cylinder 50 is forcibly driven to rotate as follows. Let "Za" be a number of tooth of the inner gear 32 (33), "Zb" a number of tooth of the outer gear 34 (35), "Ra" the outer diameter of the rubber roll 27 and "Rb" the inner diameter of the metallic elastic outer cylinder 50. If the relation Za=Zb(Rb/Ra) is satisfied, then a circumferential velocity at the outer surface of the rubber roll 27 becomes equal to that at the inner surface of the metallic elastic outer cylinder 50. This prevents slip between the outer surface of the rubber roll 27 and the inner surface of the metallic elastic outer cylinder 50.

Figure 2:
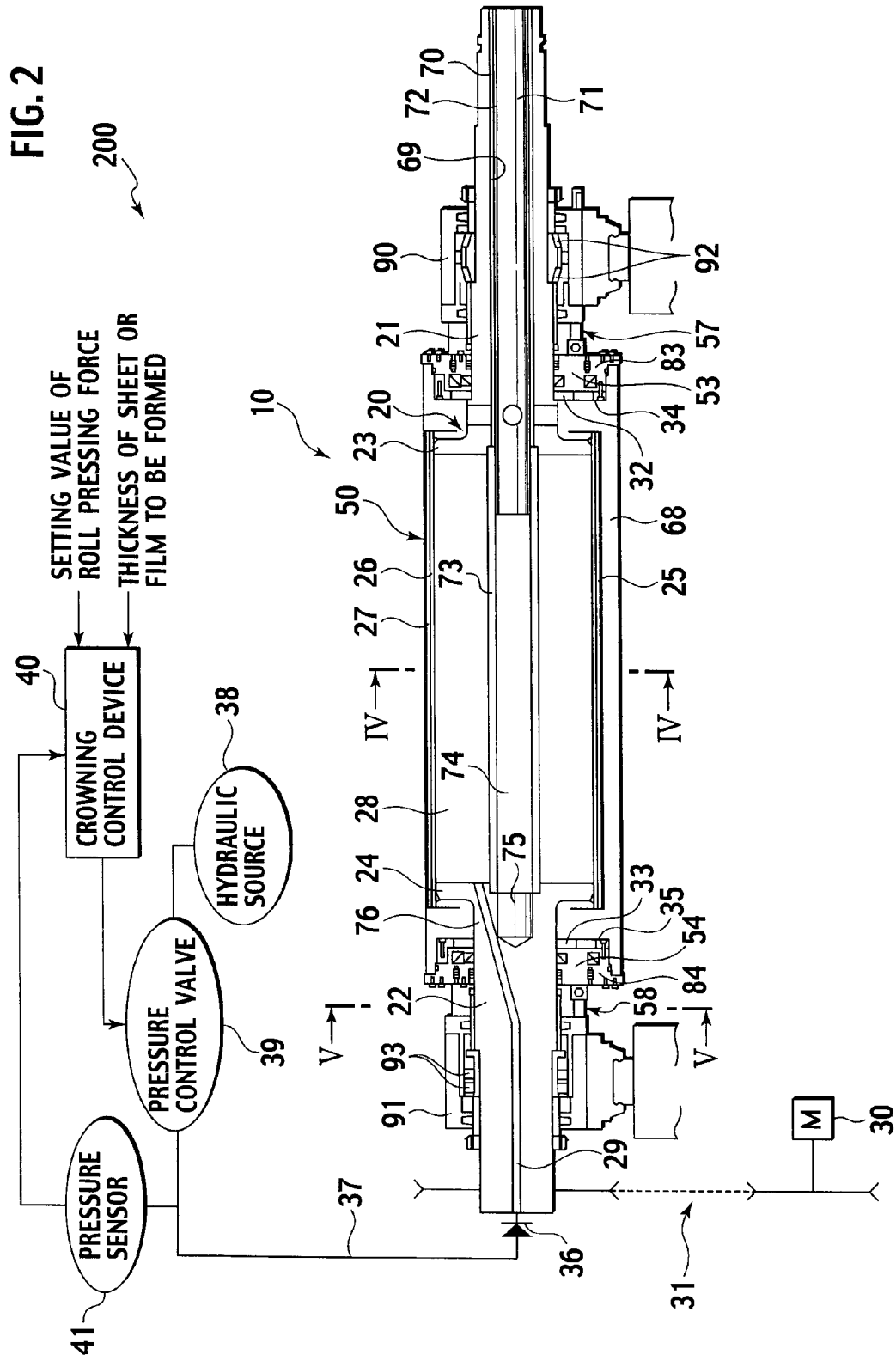
FIG. 2 is a sectional view of a sheet or film-forming apparatus applying a sheet or film-forming roll according to one embodiment of the present invention.

A mechanism of eccentricity of the eccentric side plate 54 (53) is as follows. As shown in FIG. 2, the eccentric side plate 54 (53) is connected to the bearing part 91 (90) through a detent member 58 (57) that prevents the rotation of the eccentric side plate 54 (53). This prevention using the detent member 58 (57) determines a direction of the eccentricity of the metallic elastic outer cylinder 50 from the inner cylindrical member 20.

As shown in FIG. 4, the direction is set so that the inner circumferential surface 50A of the metallic elastic outer cylinder 50 comes to contact the rubber roll 27 at a side where the metallic elastic outer cylinder 50 is pressed against the main roll 101 (right side in FIG. 4). That is, the "Cb" leaves the "Ca" toward an opposite side of the eccentric closing side.

As shown in FIG. 5, the detent member 58 (57) comprises: a projection 59 fixedly mounted on the eccentric side plate 54 (53); mounting members 60, 61 fixedly mounted on the bearing part 91 (90); and adjusting screws 62, 63 to be screw-engaged to the mounting members 60, 61. The adjusting screws 62, 63 sandwiches the projection 59 to prevent the rotation of the eccentric side plate 54 (53).

It is further possible to adjust a position of sandwiching the projection 59 in a circumferential direction of the eccentric side plate 54 (53) (clockwise and counterclockwise) by adjusting an amount of screwing of the adjusting screws 62, 63. In this way, the amount of eccentricity of the metallic elastic outer cylinder 50 is finely tuned at the side where the metallic elastic outer cylinder 50 is pressed against the main roll 101.

Next, there is explained a liquid-tight structure for cooling water (heating medium) in the cylinder inside 68 of the metallic elastic outer cylinder 50, which is different from the pressure chamber 28 of the inner cylindrical member 20. As shown in FIG. 3, the liquid-tight structure comprises: an inner sealing member 64 (65) between the shaft member 21 (22) of the inner cylindrical member 20 and the eccentric side plate 53 (54); and an outer sealing member 66 (67) between the eccentric side plate 53 (54) and the gear mounting member 83 (84).

The shaft member 21 at the operating end has a central tubular hole 69 in which a tube 70 is inserted. There are formed a heating medium supply passage 71 inside the tube 70 and a heating medium discharge passage 72 outside the tube 70. Each of the heating medium supply passage 71 and the heating medium discharge passage 72 is connected to each of a cooling water supply nipple and a cooling water discharge nipple on a fixed side through a double structured rotary joint (not shown) mounted on a shaft end of the shaft member 21.

There is explained a heating medium circulating passage in the cylinder inside 68 of the metallic elastic outer cylinder 50, which is separated from the incompressible fluid leading passage 29. As shown in FIG. 2, between the flange parts 23, 24 a tube 73 is bridged across a central part of the inner cylindrical member 20 in an axial direction of the inner cylindrical member 20. Through an in-tube passage 74 of the tube 73 and heating medium supply holes 75, 76 (FIG. 3) on the shaft member 22, the heating medium supply passage 71 (FIG. 3) of the shaft member 21 is communicated with one end of the cylinder inside 68 (left side in FIGS. 2, 3). The other end of the cylinder inside 68 (right side in FIGS. 2,3) is communicated with the heating medium discharge passage 72 of the shaft member 21 through a heating medium discharge hole 77 (FIG. 3) on the shaft member 21.

Accordingly, cooling water is supplied to the cylinder inside 68 through the cooling water supply nipple (not shown), the rotary joint, the heating medium supply passage 71, the in-tube passage 74 and the heating medium supply holes 75, 76. The cooling water supplied to the cylinder inside 68 passes from one side to the other side through the cylinder inside 68 and then flows into the heating medium discharge hole 77, the heating medium discharge passage 72, the rotary joint (not shown), and the cooling water discharge nipple (not shown) to exit the cylinder inside 68.

At the sheet or film forming-roll 10 according to the above structure, the inner cylindrical member 20 is driven by the electrical driving device 30 to rotate around a central axis thereof (rotate with a rotation center in the center Ca) with being supported by the bearing parts 90, 91.

The rotary torque of the inner cylindrical member 20 is transmitted to the metallic elastic outer cylinder 50 through clutching between the inner gear 32 (33) and the outer gear 34 (35). The metallic elastic outer cylinder 50 is rotatably supported by the eccentric side plates 53, 54 to rotate around a central axis thereof with the rubber roll 27 contacting the inner circumferential surface thereof.

Since the metallic elastic outer cylinder 50 reliably rotates in synchronization with the rotation of the inner cylindrical member 20 through the forcible driving of a gear type, there is no slip between the metallic elastic outer cylinder 50 and the rubber roll 27.

The sheet or film-forming roll 10 employs a rubber roll inner contact-type system where the rubber roll 27 supports an inner pressure of the metallic elastic outer cylinder 50 when the metallic elastic outer cylinder 50 is pressed against the main roll 101. The sheet or film-forming roll 10 is therefore deformed elastically to fit an outer circumferential surface of the main roll 101 to form a sheet or film thinner than that formed using an outer cylinder of only the thin walled structure.

Further, it is possible to use the sheet or film-forming roll 10 directly on a commonly used sheet or film-forming device without making a driving structure complex. As well as a conventional sheet or film-forming roll, the sheet or film-forming roll 10 is driven to rotate by only connecting the electrical driving device 30 to the shaft member 22 at the driving end supported by the bearing part 91.

It is also easy to compensate the wear of the rubber roll 27, since the amount of eccentricity is adjustable by the adjusting screws 62, 63 of the detent members 57, 58. Further, if the distribution of inner pressure is deviated due to the wear of the rubber roll 27, it is possible to solve the deviation even in use.

During both the inner cylindrical member 20 and the metallic elastic cylinder outer 50 rotate to form a sheet or film, the crowning control device 40 outputs pulse signals to control the pressure value of the oil to get an appropriate amount of crowning, depending on the setting value of the pressure of the touch roll, the thickness of a sheet or film to be formed, or the kind of resin to be used. Then the oil with its pressure value controlled is supplied to the pressure chamber 28 of the inner cylindrical member 20.

Therefore, the elastic cylindrical body 25 is deformed elastically (crowning change) depending on the pressure value of the oil (inner pressure of the elastic cylindrical body 25) to deform the metallic elastic outer cylinder 50 elastically (crowning change).

Apart from circulating the heating medium within the cylinder inside 68 of the metallic elastic outer cylinder 50, it is possible to give an appropriate amount of crowning on the sheet or film-forming roll 10 without making it difficult to control the surface temperature of the sheet or film-forming roll 10.

Unlike the pressure value the heating medium circulated within the cylinder inside 68 of the metallic elastic outer cylinder 50, it is possible to set the pressure value of the oil to be supplied to the pressure chamber 28 at a high-pressure value over 10 MPa. Even under such high-pressure, there is no effect on a pressure suffering ability of the sealing members 64, 65, 66, 67. It is also possible to obtain stable pressure since the oil in the pressure chamber 28 does not circulate within the pressure chamber 28. These enable to provide a stable and adjustable amount of crowning.

Note that if the enough amount of crowing is not compensated by only giving pressure to the oil, it is possible to shape the elastic cylindrical body 25 of the inner cylindrical member 20 in a drum shape with a least amount of crowning as an initial shape.

The sheet or film-forming roll of the present invention is not necessarily equipped with the inner gears 32, 33 and the outer gears 34, 35. It is possible to omit them when the rotary torque of the inner cylindrical member 20 and the rubber roll 27 is fully transmitted to the outer metallic elastic cylinder 50 by frictional force of a contacting part between the rubber roll 27 and the outer metallic elastic cylinder 50. When forming a less thinned sheet or film with the forcible driving of the gears 32, 33, 34, 35, it is not necessarily use the rubber roll 27, and the elastic cylindrical body 25 is possible to be configured by only an elastic metal cylinder.

As explained above, in the sheet or film-forming roll of the present invention, an elastic cylinder has a closed structure that is a pressure chamber in which oil is supplied. By controlling the pressure value of the oil to be supplied, the elastic cylinder is deformed with crowing and thereby deforms an elastic metallic outer cylinder depending on the pressure value (inner pressure of the elastic chamber). Apart from circulating the heating medium inside the outer metallic elastic cylinder 50, it enables to supply a stable and adjustable amount of crowning on the sheet or film-forming roll without making it difficult to control the surface temperature of the sheet or film-forming roller and without being affected by pressure fluctuations.

This application is based upon the Japanese Patent Application No. 2005-376029, filed on Dec. 27, 2005, the entire content of which is incorporated by reference herein.

Although the present invention has been described above by reference to certain embodiments of the invention, this invention is not limited to these embodiments and modifications will occur to those skilled in the art, in light of the teachings. The scope of the invention is defined with reference to the following claims.

What is claimed is:

1. A sheet or film-forming roll, comprising:
   an inner cylindrical member including an elastic cylindrical body having:
      a pressure chamber in the elastic cylindrical body, the pressure chamber being arranged to have a hermetically closed structure; and
      a shaft portion having a first passage that leads incompressible fluid to the pressure chamber; and
   an elastic outer cylindrical member arranged eccentrically to the inner cylindrical member so that an inner circumferential surface of the elastic outer cylindrical member comes into contact with an outer circumferential surface of the elastic cylindrical body, the elastic outer cylindrical member being provided with a thin-walled structure and made from metal.

2. The roll of claim 1, further comprising:
   a pair of eccentric side plates, each of which is rotatably mounted on each of the shaft portions of the inner cylindrical member to rotatably support the outer cylindrical member.

3. The roll of claim 1, further comprising:
   a second passage that circulates heating medium inside the outer cylindrical member.

4. The roll of claim 1, wherein
the elastic cylindrical body includes: a metal cylindrical member; and a rubber roll that covers an outer circumferential surface of the metal cylindrical member, the rubber roll having capable of contacting an inner circumferential surface of the outer elastic cylindrical member.

5. The roll of claim 1, further comprising:
a gear structure that transfers rotary torque of the inner cylindrical member to the outer cylindrical member.

6. The roll of claim 2, further comprising:
a detent member that prevents rotation of one of the eccentric side plates against one of the shaft portions, the detent member having a structure capable of adjusting a position of preventing of the eccentric side plate in a circumferential direction so as to adjust an eccentric amount of the outer cylindrical member.

7. A crowning control method of a sheet or film-forming roll, comprising a sheet or film-forming roll including:
an inner cylindrical member including an elastic cylindrical body having:
  a pressure chamber in the elastic cylindrical body, the pressure chamber being arranged to have a hermetically closed structure; and
  a shaft portion having a first passage that leads incompressible fluid to the pressure chamber; and
an elastic outer cylindrical member arranged eccentrically to the inner cylindrical member so that an inner circumferential surface of the elastic outer cylindrical member comes into contact with an outer circumferential surface of the elastic cylindrical body, the elastic outer cylindrical member being provided with a thin-walled structure and made from metal, the crowning control method comprising:
giving a pressure to the incompressible fluid led to the pressure chamber via the first passage;
measuring the pressure given to the incompressible fluid;
calculating a target value of pressure to be given to the incompressible fluid to give an amount of crowning to be given to the outer cylindrical member; and
reducing the pressure given to the incompressible fluid close to the target value.

8. A sheet or film-forming apparatus, comprising:
a sheet or film-forming roll including:
  an inner cylindrical member including an elastic cylindrical body having:
    a pressure chamber in the elastic cylindrical body, the pressure chamber being arranged to have a hermetically closed structure; and
    a shaft portion having a first passage that leads incompressible fluid to the pressure chamber; and
  an elastic outer cylindrical member arranged eccentrically to the inner cylindrical member so that an inner circumferential surface of the elastic outer cylindrical member comes into contact with an outer circumferential surface of the elastic cylindrical body, the elastic outer cylindrical member being provided with a thin-walled structure and made from metal;
a hydraulic source that gives a pressure to the incompressible fluid led to the pressure chamber via the first passage;
a pressure sensor that measures the pressure given to the incompressible fluid;
a crowning controller that calculates a target value of pressure to be given to the incompressible fluid to give an amount of crowning to be given to the outer cylindrical member; and
a pressure controller that reduces the pressure given to the incompressible fluid close to the target value.

* * * * *